US 6,499,058 B1

(12) United States Patent
Hozumi (10) Patent No.: US 6,499,058 B1
(45) Date of Patent: Dec. 24, 2002

(54) FILE SHARED APPARATUS AND ITS METHOD FILE PROCESSING APPARATUS AND ITS METHOD RECORDING MEDIUM IN WHICH FILE SHARED PROGRAM IS RECORDED AND RECORDING MEDIUM IN WHICH FILE PROCESSING PROGRAM IS RECORDED

(76) Inventor: Motokazu Hozumi, 1588-47, Kanamori, Machida-shi, Tokyo 194-0012 (JP)

( * ) Notice: Subject to any disclaimer, the term of this patent is extended or adjusted under 35 U.S.C. 154(b) by 0 days.

(21) Appl. No.: 09/392,964

(22) Filed: Sep. 9, 1999

(51) Int. Cl.$^7$ ............................................. G06F 15/173
(52) U.S. Cl. ..................... 709/225; 707/229; 713/201
(58) Field of Search ................................. 709/225–229; 340/825, 825.5; 710/36, 107–108, 240, 200; 711/150, 163; 713/210, 201; 707/8; 714/9, 5–6

(56) References Cited

U.S. PATENT DOCUMENTS

| 5,588,143 A | 12/1996 | Stupek, Jr. et al. |
| 5,802,366 A | 9/1998 | Row et al. |
| 5,813,016 A | 9/1998 | Sumimoto |
| 5,828,876 A | 10/1998 | Fish et al. |
| 5,832,522 A | 11/1998 | Blickenstaff et al. |
| 5,878,220 A | 3/1999 | Olkin et al. |
| 5,884,046 A | 3/1999 | Antonov |
| 5,933,824 A * | 8/1999 | DeKoning et al. .............. 708/8 |
| 6,044,367 A * | 3/2000 | Wolff .............................. 707/2 |
| 6,148,414 A * | 11/2000 | Brown et al. .................... 714/9 |
| 6,192,408 B1 * | 2/2001 | Vahalia et al. ............... 709/229 |
| 6,263,445 B1 * | 7/2001 | Blumenau .................... 713/201 |
| 6,356,944 B1 * | 3/2002 | McCarty ...................... 709/222 |

* cited by examiner

Primary Examiner—Zarni Maung
Assistant Examiner—Wen Tai Lin
(74) Attorney, Agent, or Firm—Rosenthal & Osha L.L.P.

(57) ABSTRACT

A conventional data shared system using a plurality of processing nodes and data storage units in a storage area network using SAN OS was a volume-level locking or a file-system-level locking through one limited server. A locking system for SAN proposed this time is one that is a file-system-level locking and creates no single point of failure. Namely, the locking system is incorporated into each storage unit of Storage Area Network to run software. As a result, the storage unit is converted to an intelligent form and an acceptor (1) for a first protocol and an acceptor (2) for a second protocol coexist. This allows the acceptor (1) to perform a locking mechanism and the acceptor (2) to perform data transfer, so that the locking system that is a file system level locking and that creates no single point of failure can be realized. The plurality of protocols is thus used so as to execute data control and data transfer efficiently.

7 Claims, 8 Drawing Sheets

FILE SHARED APPARATUS AND ITS METHOD FILE PROCESSING APPARATUS AND ITS METHOD RECORDING MEDIUM IN WHICH FILE SHARED PROGRAM IS RECORDED AND RECORDING MEDIUM IN WHICH FILE PROCESSING PROGRAM IS RECORDED

BACKGROUND OF THE INVENTION

1. Field of the Invention

The present invention relates to a data shared system using a plurality of processing units and data storage units in a storage area network.

2. Description of the Prior Art

Introduction to Fibre Channel

Fibre Channel is an American National Standards Institute interface including SCSI-3, HIPPI-FP, IP and ATM/AAL5. Fibre Channel Arbitrated Loop is one topology used to connect two or more devices within the guidelines by ANSI standard.

Fibre Channel supports both large and small data transfers with the feature of separating the physical I/O interface from the I/O operation.

It can support both channel and network peripheral protocols for device communication. This means that channel and network protocols can share the same physical medium.

Fibre Channel does not have its own native I/O command set protocol. It simply lets other protocol superimpose their command sets onto itself and then transports this information with very high bandwidth over 100 M bytes per second.

Fibre Channel systems take on three topologies: point to point, arbitrated loop and switched fabric. Point-to-point connections are paths between two nodes in a network. Fibre channel arbitrated Loop (FC-AL) consists of multiple nodes chained from a system. Third one is switched design that allows huge number of nodes to be connected through switches.

Fibre Channel connectivity is accomplished in much the same way that today's local area networks (LAN) are assembled. Network interface cards should be installed to each node and connected via physical cabling. To build networks, arbitrated loop hubs and fabric switches are used.

One of the most attractive features of Fibre Channel is that it merges the channel and the networking paths. Due to its generic transport capability, Fibre Channel can carry channel traffic such as SCSI or HIPPI as well as Ethernet over the same physical connection.

Before Fibre Channel, two distinct paths existed in the LAN for sending information. The first is the network and the second is channel (storage bus). Networks consist of much more random communication than do channels. Network protocols establish the rule (protocol) by which the network sends and receives data. As a result, networks have high overhead.

On the contrary, channels perform a very straightforward task, sending and receiving data. Therefore, channel performance is much higher than networks, but channel can not handle sophisticated task like file protocol handling.

Fibre channel has both of network and channel capability, so there is a possibility to have both sophisticated protocol and channel level performance. But current technology does not have the solution how to merge sophisticated protocols into channel interface.

Introduction to SAN (Storage Area Network)

Storage Area Network uses typically channel paths to get high performance interconnected shared storage environment. SAN is another network constructed from local interconnects such as SCSI, Escon and Fibre Channel. SAN is a new way of attaching storage units to the Network. SAN enables the storage unit to be separated from the server and enables the storage unit to be shared among multiple servers.

LAN comprises network traffic, whereas the SAN interconnects channel paths. LAN protocols offer a feasible solution for creating networks of storage units. On the other hand, SAN is very suitable for storage sharing with multiple servers by very high performance. But SAN does not provide feasible solution for networks, because channel interface does not provide network protocols.

The problem with early stage of SAN is that servers can not actually share the data on the storage while the storage is to be said shared among the several servers. So the first stage of SAN OS provided volume-level locking mechanism in order to solve the problem. But its performance is not good, not drawing out potential SAN performance.

Volume-level locking is to lock the entire HDD or a partition of HDD in order to share the data of HDD. This method is very primitive, because the unity of the lock is physical unit of HDD. The granularity is not fine, so the performance of volume-level locking is not good.

In the second stage, SAN OS provided file-level locking mechanism in order to solve both of the problems. But still they have a problem. That is the second stage SAN OS requires other servers to access storage through a single server that handles locking mechanism. This creates potential bottlenecks and single point of failure.

File-level locking mechanism is to lock each file to use. This method depends on the logical structure of data. The granularity of lock level is fairly fine, so the users can get good performance through file-level locking mechanism.

SUMMARY OF THE INVENTION

According to the present invention, there is provided a shared file apparatus accessed via a network, in which a plurality of protocols are usable, by a plurality of file processing apparatuses interconnected by the network, the shared file apparatus comprising:

a first acceptor for accepting a file lock request from the file processing apparatuses by use of a first protocol;

a sender for sending a file access allowance to one of the file processing apparatuses upon receipt of the file lock request; and a second acceptor for accepting a file access command from the file processing apparatus by use of a second protocol to which the file access allowance is sent.

Also, according to the present invention, there is provided a shared file apparatus accessed via a network, in which both a Network Protocol and a Storage Protocol are usable, by a plurality of file processing apparatuses interconnected by the network, the shared file apparatus comprising:

a first acceptor for accepting a file lock request from the file processing apparatuses by use of the Network Protocol;

a sender for sending a file access allowance to one of the file processing apparatuses upon receipt of the file lock request; and a second acceptor for accepting a file access command from the file processing apparatus by use of the Storage Protocol to which the file access allowance is sent.

Moreover, according to the present invention, there is provided a method of sharing a file accessed via a network, in which a plurality of protocols are usable, by a plurality of file processing apparatuses interconnected by the network, the method comprising:

accepting a file lock request from the file processing apparatuses by use of a first protocol;

sending a file access allowance to one of the file processing apparatuses; and accepting a file access command from the file processing apparatus by use of a second protocol to which the file access allowance is sent.

Further, according to the present invention, there is provided a computer-readable storage medium having a program recorded thereon;

where the program is to make the computer execute a method of sharing a file accessed via a network, in which a plurality of protocols are usable, by a plurality of file processing apparatuses interconnected by the network, the method comprising:

accepting a file lock request from the file processing apparatuses by use of a first protocol;

sending a file access allowance to one of the file processing apparatuses; and accepting a file access command from the file processing apparatus by use of a second protocol to which the file access allowance is sent.

Furthermore, according to the present invention, there is provided a file processing apparatus for accessing a shared file apparatus connected to a network in which a plurality of protocols are usable via the network, the file processing apparatus comprising:

a first sender for sending a file lock request to the shared file apparatus by use of a first protocol;

an acceptor for accepting a file access allowance from the shared file apparatus to which the file lock request is sent; and a second sender for sending a file access command to the shared file apparatus by use of a second protocol upon receipt of the file access allowance.

Also, according to the present invention, there is provided a file processing method for accessing a shared file apparatus connected to a network, in which a plurality of protocols are usable, via the network, the method comprising:

sending a file lock request to the shared file apparatus by use of a first protocol;

accepting a file access allowance from the shared file apparatus to which the file lock request is sent; and sending a file access command to the shared file apparatus by use of a second protocol upon receipt of said file access allowance.

Moreover, according to the present invention, there is provided a computer-readable storage medium having a program recorded thereon;

where the program is to make the computer execute a file processing method for accessing a shared file apparatus connected to a network, in which a plurality of protocols are usable, via the network, the method comprising:

sending a file lock request to the shared file apparatus by use of a first protocol;

accepting a file access allowance from the shared file apparatus to which the file lock request is sent; and sending a file access command to the shared file apparatus by use of a second protocol upon receipt of said file access allowance.

DETAILED DESCRIPTION OF THE PREFERRED EMBODIMENTS

Embodiments will now be specifically described with reference to the accompanying drawings. It should be noted that embodiments set forth below are not limitative of the cope of claims.

The feature of the storage area network lies in that a plurality of processing units and storage units are interconnected by a drastically high-speed storage bus as compared a conventional LAN so as to allow very high-speed data processing to be executed.

Since SCSI command, which was the conventional typical storage bus, did not handle a Network Protocol, physical data was exchanged between a processing node and a storage unit, but data was not handled as a logical structure, namely, a file system.

In the early stage of SAN OS, there was no other than volume-level locking as sharing means when the plurality of processing units intended to share the storage unit in SAN. Then, there was a disadvantage in which a good performance was not obtained because of roughness of the granularity of lock level.

On the contrary, in the currently used SAN OS of the next stage, one processing unit managed the file systems of all storage units in SAN. The management of the lock for sharing by the processing unit realized a file level locking with respect to data in SAN.

Figure 1:
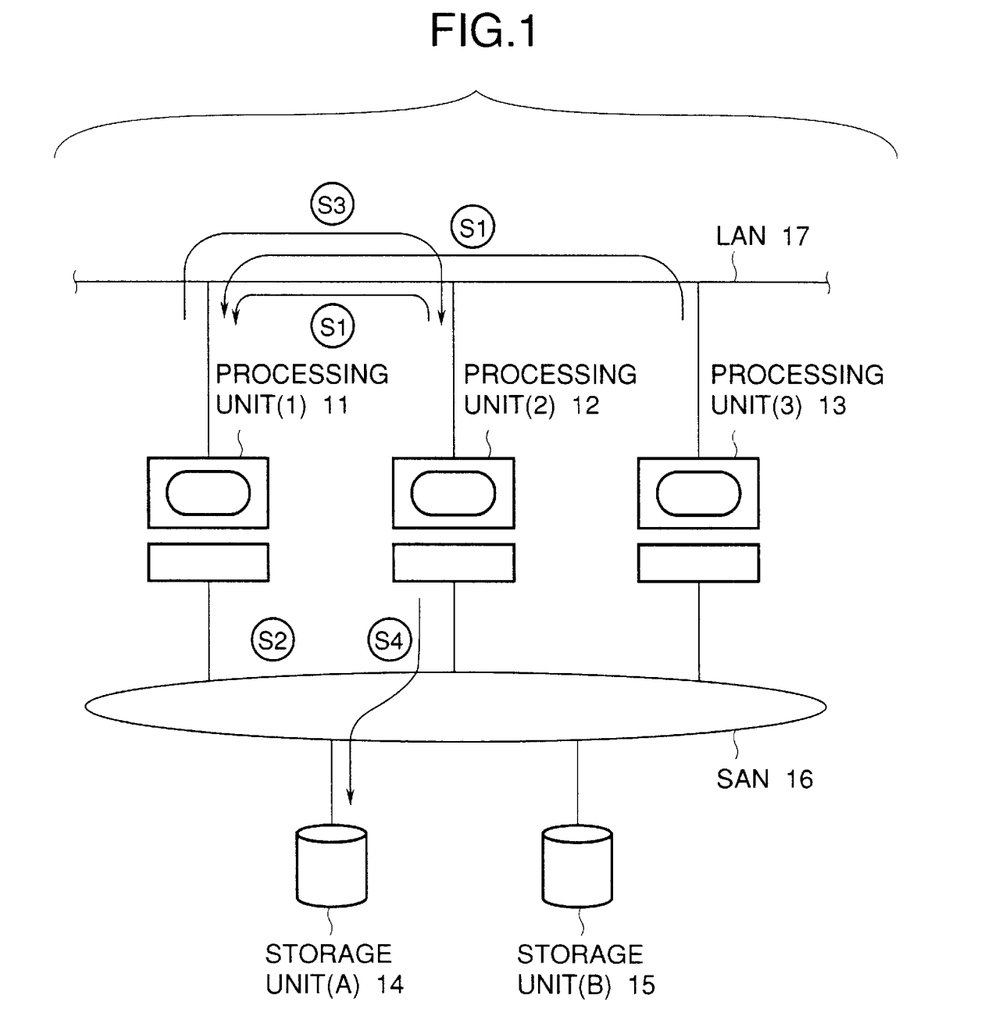
FIG. 1 is a view showing a configuration of a conventional system.

FIG. 1 is a view showing a configuration of a conventional system in which data is shared in Storage Area Network using this file-level locking mechanism. In this figure, a processing unit (1) 11, a processing unit (2) 12, a processing unit (3) 13, a storage unit (A) 14, and a storage unit (B) 15 are interconnected by a storage area network 16. Then, the processing unit (1) 11, the processing unit (2) 12, and the processing unit (3) 13 are interconnected by a LAN 17.

When the processing unit (2) 12 and the processing unit (3) 13 intend to share data in the storage unit (A) 14, sharing processing are carried out based on the following steps:

First, in the storage area network, there exists only one processing unit that manages the file systems of all storage units in the storage area network in a unified way. In FIG. 1, there exists the processing unit (1) 11 that manages the file systems of the storage unit (A) 14 and the storage unit (B) 15. In this case, it is assumed that there is a file system in the storage unit (A) 14 which the processing unit (2) 12 and the processing unit (3) 13 wish to use. They request the processing unit (1) 11, which is the manager, to allow data-use, that is the lock, via LAN 17. Thereafter, either one of the processing unit (2) 12 and the processing unit (3) 13 is allowed to use the data (in this case, it is assumed that the the processing unit (2) 12 is allowed). At this time, data exchange is directly carried out between the processing unit (2) 12 and the storage unit (A) 14 using the very high-speed storage bus, which the biggest feature of the storage area network.

Figure 2:
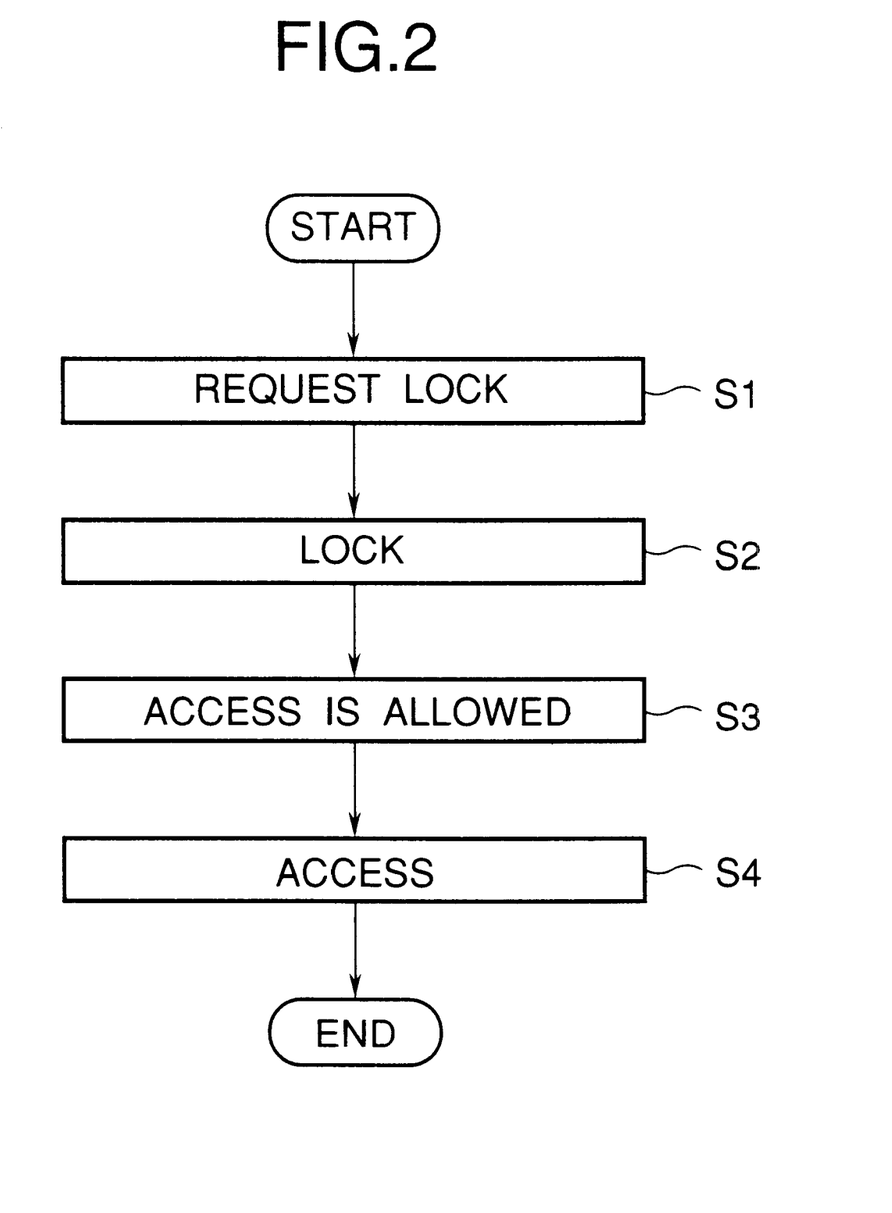
FIG. 2 is a flow chart showing an operation of the conventional system of FIG. 1.

FIG. 2 is a flow chart showing an operation of the conventional system of FIG. 1. In FIG. 1, data can be accessed through the following four steps.

Step S1: The processing unit (2) 12 and the processing unit (3) 13 request the processing unit (1) 11, which manages the file level lock, to allow the lock of data, which they wish to use.

Step S2: At this time, the processing unit (1) 11 locks the data for a processing unit with a high priority (the processing unit (2) 12 in this case).

Step S3: The processing unit (1) 11 notifies the processing unit (2) 12 that the specified file has been locked (LAN is employed since steps S1 to S3 normally use Network Protocol.)

Step S4: The processing unit (2) 12 accesses data in the storage unit (A) 14 at high speed using Storage Area Network after receiving the notification from the processing unit (1) 11 (storage area network (SAN) is used since step S4 uses only Storage Protocol).

However, the lock needs managing in a unified way due to the property of lock, and only one processing unit manages the lock. For this reason, there remains a danger to the entire system, that is, a disadvantage in which the only one processing unit results in single-point-of-failure.

On the other hand, if a Distributed Lock Manager (DLM) is introduced to the processing unit (1) 11, the processing unit (2) 12, and the processing unit (3) 13 in the case of FIG. 1, this disadvantage can be eliminated, but high performance of storage area network will be fairly sacrificed for this introduction.

Figure 3:
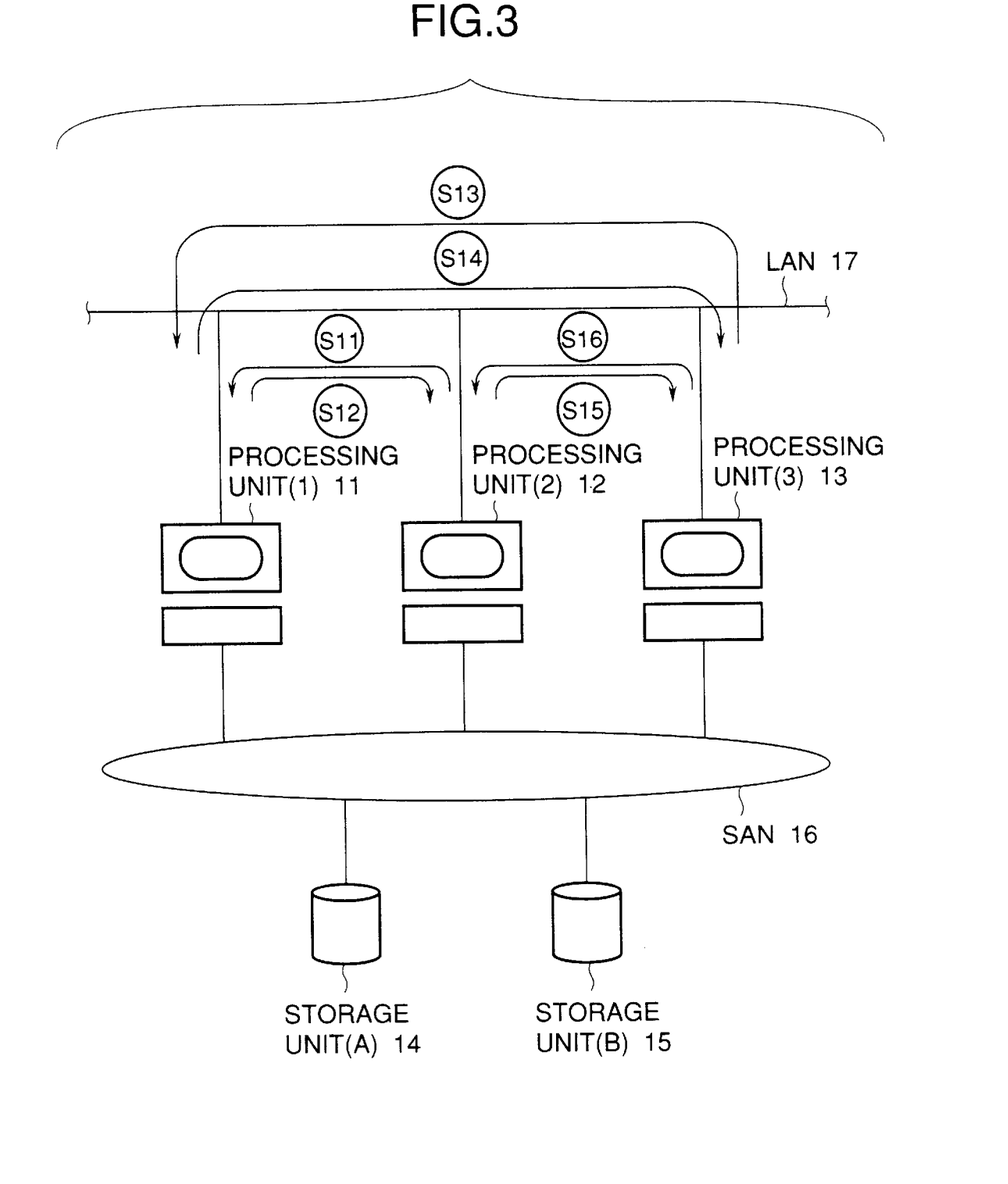
FIG. 3 is a view showing a configuration of another conventional system.

FIG. 3 is a view showing a configuration of the conventional system in which data is shared in Storage Area Network using DLM. The outline of the hardware configuration of the system is the same as that of FIG. 1. In the case of using DLM, an amount of communications among processing units is high, and the performance is sacrificed as a whole. In DLM, since each of processing units 11, 12, 13 can have the lock, they are on an equal footing with each other. Therefore, the danger of single-point-of-failure is avoided but a one-to-one correspondence between the lock and data is lost. For this reason, if the processing unit (2) 12 and the processing unit (3) 13 intend to lock the same data in the storage unit (A) 14, data communications among the processing unit (1) 11, the processing unit (2) 12, and the processing unit (3) 13 must be carried out at least six times in order to determine whether or not the lock is allowable as shown in FIG. 3. This causes deterioration in performance.

Figure 4:
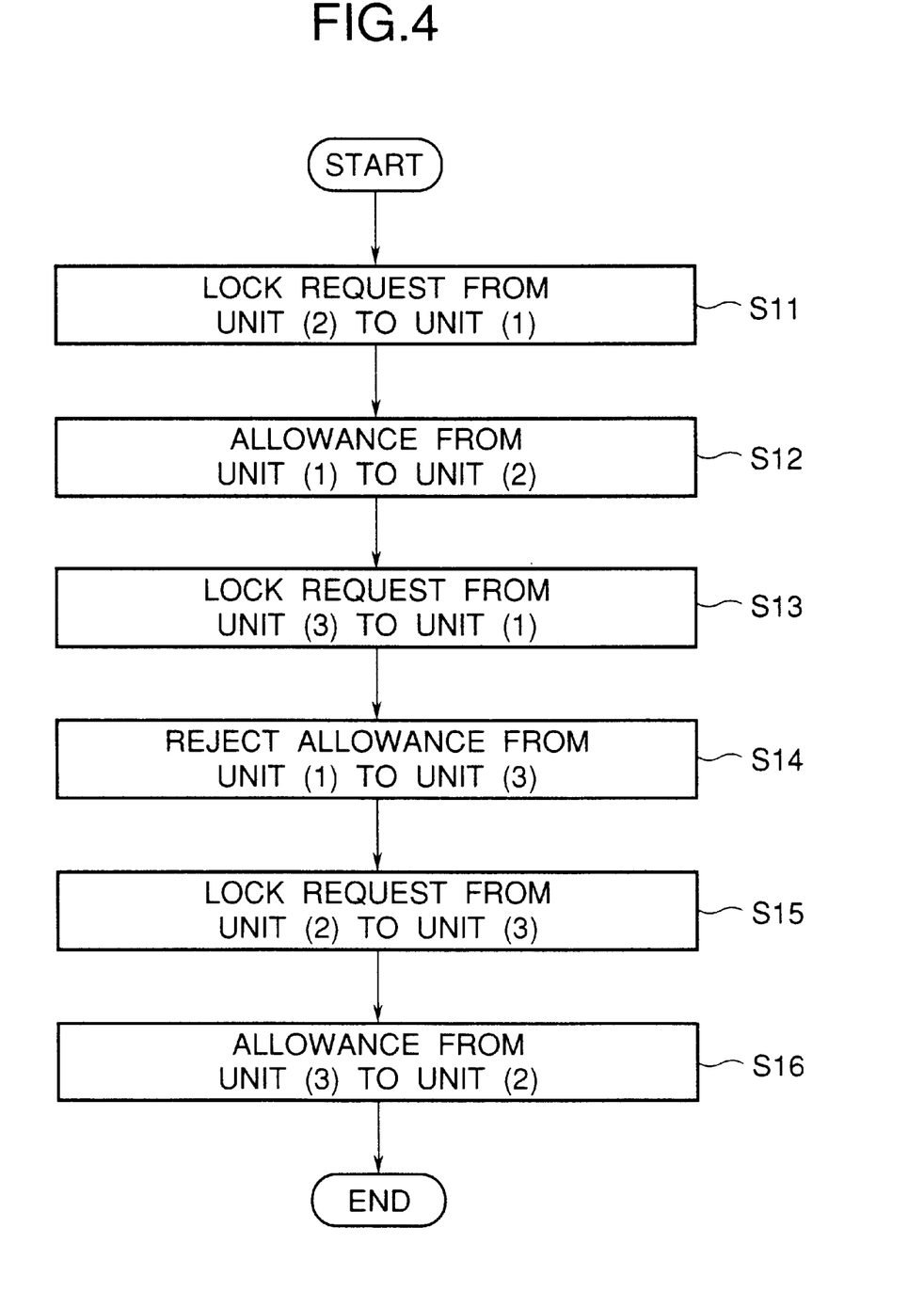
FIG. 4 is a flow chart showing an operation of the conventional system of FIG. 3.

FIG. 4 is a flow chart showing an operation of the conventional system of FIG. 3.

Step S11: The processing unit (2) 12 informs the processing unit (1) 11 that the processing unit (2) 12 wishes to lock data that unit (2) 12 uses.

Step S12: The processing unit (1) 11 informs the processing unit (2) 12 that such data is usable, and locks such data in itself at the same time.

Step S13: The processing unit (3) 13 informs the processing unit (1) 11 that the processing unit (3) 13 wishes to lock data that unit (3) 13 uses.

Step S14: The processing unit (1) 11 informs the processing unit (3) 13 that such data is already locked by the processing unit (2) 12 and is unusable.

Step S15: The processing unit (2) 12 informs the processing unit (3) 13 that the processing unit (2) 12 wishes to lock data that unit (2) 12 uses.

Step S16: Since the processing unit (3) 13 knows that data that the unit (3) 13 uses is already locked in step S14, the processing unit (3) 13 allows the processing unit (2) 12 to use, and records that the processing unit (2) 12 has locked data in itself. Finally, the processing unit (2) 12 records the lock of data, which the processing unit (2) 12 wishes to use, in itself.

[First Embodiment]

The following will explain a case in which Network Protocol is used as a first protocol and Storage protocol such as SCSI, HIPPI-FP, IPI, etc., particularly Channel Interface is used as a second protocol.

The lock mechanism of the present invention relates to a method for sufficiently bringing about high-speed performance of storage area network without causing single-point-of-failure and relates to its apparatus. In other words, there is used an apparatus having embedded software, which is put in a storage unit in SAN and which manages a file system of only data stored in the storage unit. The use of such an apparatus makes it possible to manage the lock, which is conventionally managed by one processing unit, in a spread manner on a storage side corresponding to each data.

The importance of this case can be largely divided into two points. One is that one-to-one correspondence between the lock and data is not lost, and the other is how the embedded software on the storage unit and the program on the processing unit lock data using a storage bus. Regarding the former point, since the address of lock simply moves from a specific processing unit to a storage unit where data is stored, it is easily understood that one-to-one correspondence between the lock and data is unchanged. This method will be specifically explained with reference to the drawings.

Figure 5:
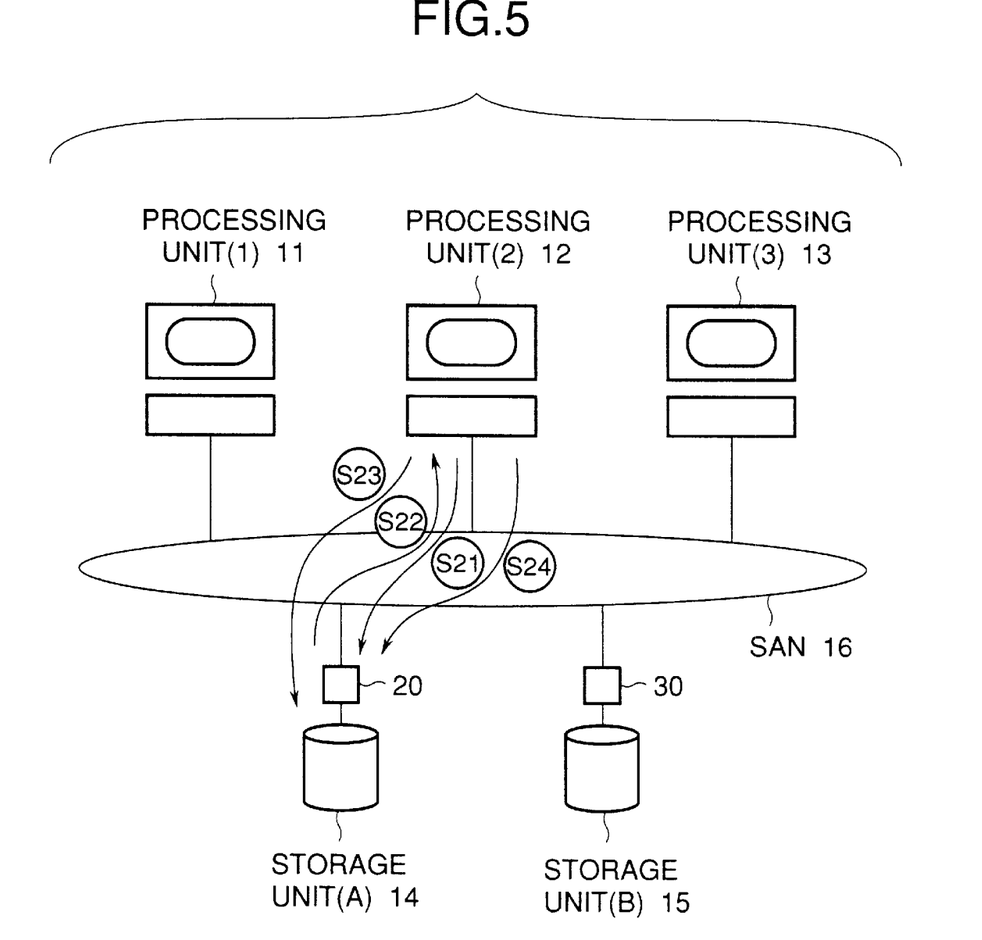
FIG. 5 is a view showing a configuration of a system of the present invention.

FIG. 5 is a view showing a configuration of a system of the present invention. A processing unit (1) 11, a processing unit (2) 12, a processing unit (3) 13, a storage unit (sharing file apparatus) (A) 14, and a storage unit (B) 15 are interconnected by a storage area network 16. The storage (A) 14 comprises a lock mechanism 20, and the storage unit (B) 15 comprises a lock mechanism 30.

In the conventional method, all lock mechanisms of the storage units in SAN were managed by the processing unit (1) 11 (SANergy by Mercury and FibreNet by Transoft). In a method we proposed here this time, a system for setting a lock to a file structure is built in each of the storage units (the storage unit (A) 14 and the storage unit (B) 15 in FIG. 3) as a pair of hardware and software. At this time, since the lock system of data in the storage unit (A) 14 is provided in the storage unit (A) 14 and that of data in the storage unit (B) 15 is provided in the storage unit (B) 15, it is obvious that that one-to-one correspondence between the lock and data is unchanged.

Figure 6:
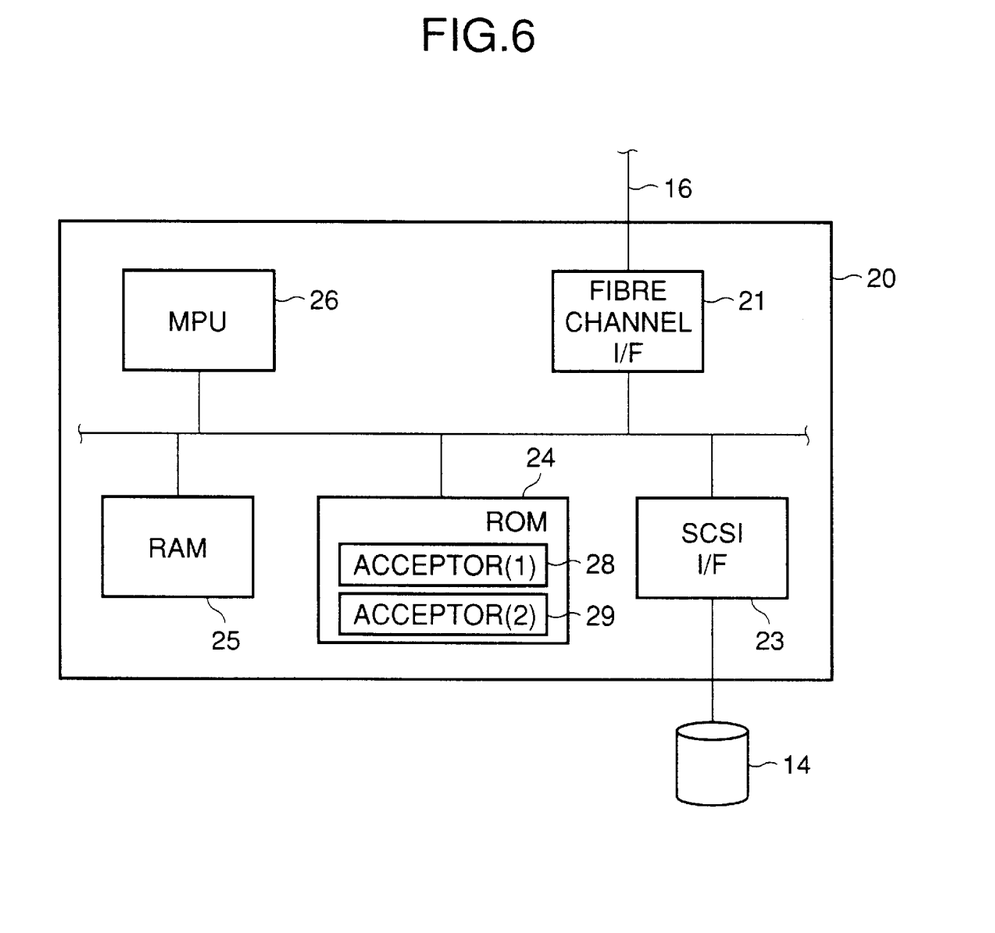
FIG. 6 is a view showing one example of a hardware configuration of a lock mechanism 20.

FIG. 6 is a view showing one example of a hardware configuration of the lock mechanism 20 (and lock mechanism 30). The lock mechanism 20 comprises a fibre channel interface chip 21 connected to SAN 16, an SCSI interface chip 23 connected to HDD 14, a ROM 24 in which a file shared program is recorded on a basis of an acceptor (1) 28 and an acceptor (2) 29 for controlling a fibre channel interface chip 2, a RAM 25 for loading the file shared program to execute, and an MPU 26 for controlling the entirety of the lock mechanism 20.

According to the present invention, the acceptor (1) 28 accepts a lock request using the Network Protocol from SAN 16. Also, the acceptor (2) 29 accepts a data read and write request to the locked data using the Storage Protocol and transmits it to HDD 14. Thus, the embedded software stored in ROM 24 (or RAM Disk) can interpret all file protocols and manage them. You can introduce SMB, NFS, FTP, Netatalk to embedded Linux for making an example of such kind of embedded software. The embedded software enables cross-file-protocol locking to be performed by expansion of lockd (lock deamon). By use of this embedded software, the storage unit is managed.

In the conventional SCSI I/F, there was a problem in which the Network Protocol was not interpreted. However, the emergence of Fibre channel makes it possible to flow the Storage Protocol and the Network Protocol onto the same cable, thereby acceptor (1) 28 and the acceptor (2) 29 can interpret both protocols depending on how to write the embedded software of a device driver.

For example, the protocol is changed by use of the function of a dynamic load of the device driver such as Linux, or communications between drivers are performed by application of I²O technique. As a result, an integrated driver that can handle two protocols at the same time can be created.

At this time, the file level locking is made using the Network Protocol, and the very high-speed Storage Protocol can be used to exchange storage data.

Figure 7:
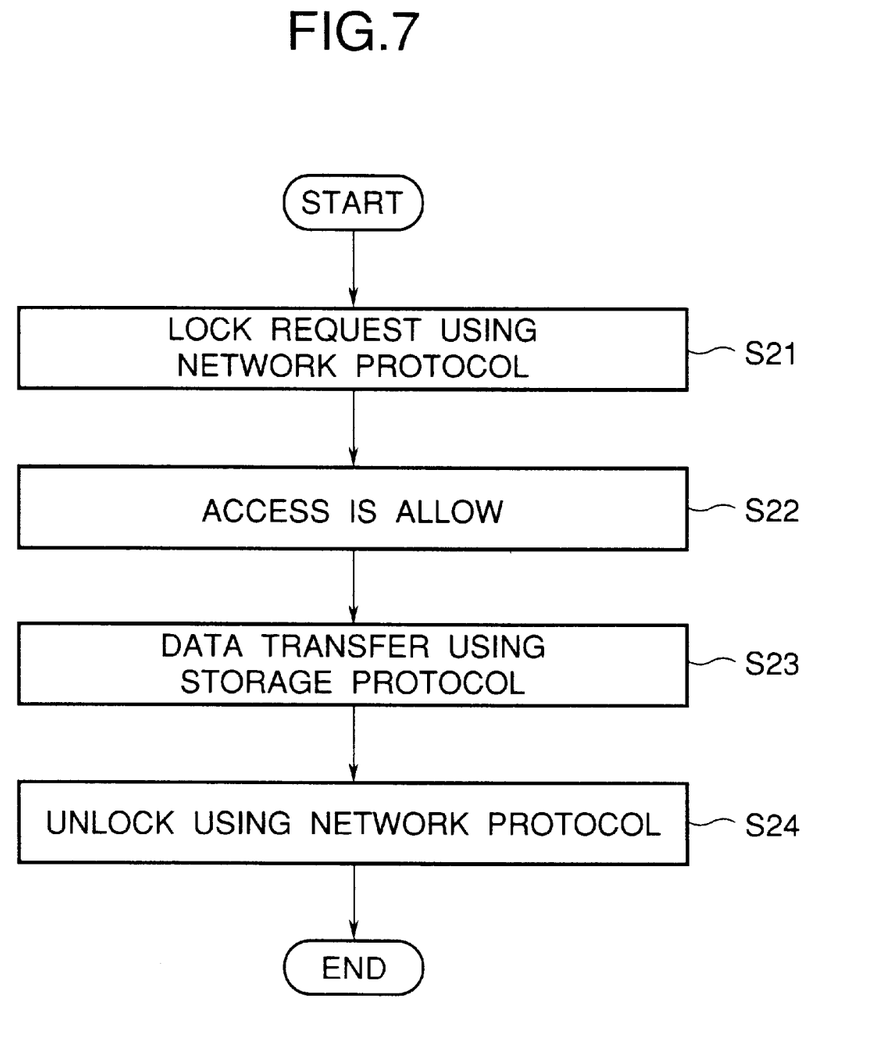
FIG. 7 is a flow chart showing an operation of the system of the present invention of FIG. 5.

FIG. 7 is a flow chart showing an operation of the system of the present invention of FIG. 5.

Step S21: The processing unit (2) 12 and the processing unit (3) 13 send a file lock request to a lock system of the storage unit (A) 14 by use of the Network Protocol on storage area network 16, and the storage unit (A) 14 accepts the file lock request through the acceptor (1) 28.

Step S22: At this time, the lock system of the storage unit (A) 14 determines priority of processing units (it is assumed that the processing unit (2) 12 has higher priority than the processing unit (3) 13 in this case) when accepting the file lock request from the processing unit (2) 12 and the processing unit (3) 13. Then, the lock system of the storage unit (A) 14 sends the fact that the specified file has been locked, that is, a file access allowance to the processing unit (2) 12 together with a time-stamp. Then, the processing unit (2) 12 accepts the file access allowance.

Step S23: Here, the processing unit (2) 12 accesses data of the storage unit (A) 14 at high speed this time. In other words, the processing unit (2) 12 sends a file access command to the storage unit (A) 14, and the storage unit (A) 14 accepts the file access command through the acceptor (2) 29.

Step S24: When processing is ended, the specified file of the storage unit (A) 14 is unlocked using the time-stamp obtained in step S22. Absence of the time-stamp makes it difficult to prevent occurrence of not allowed access, particularly not allowed unlock.

[Second Embodiment]

The following will explain a case in which type 5 protocol of AAL (ATM Adaptation layer) of ATM (Asynchronous Transfer Mode) is used as a first protocol and AAL type 1 protocol of ATM is used as a second protocol.

Figure 8:
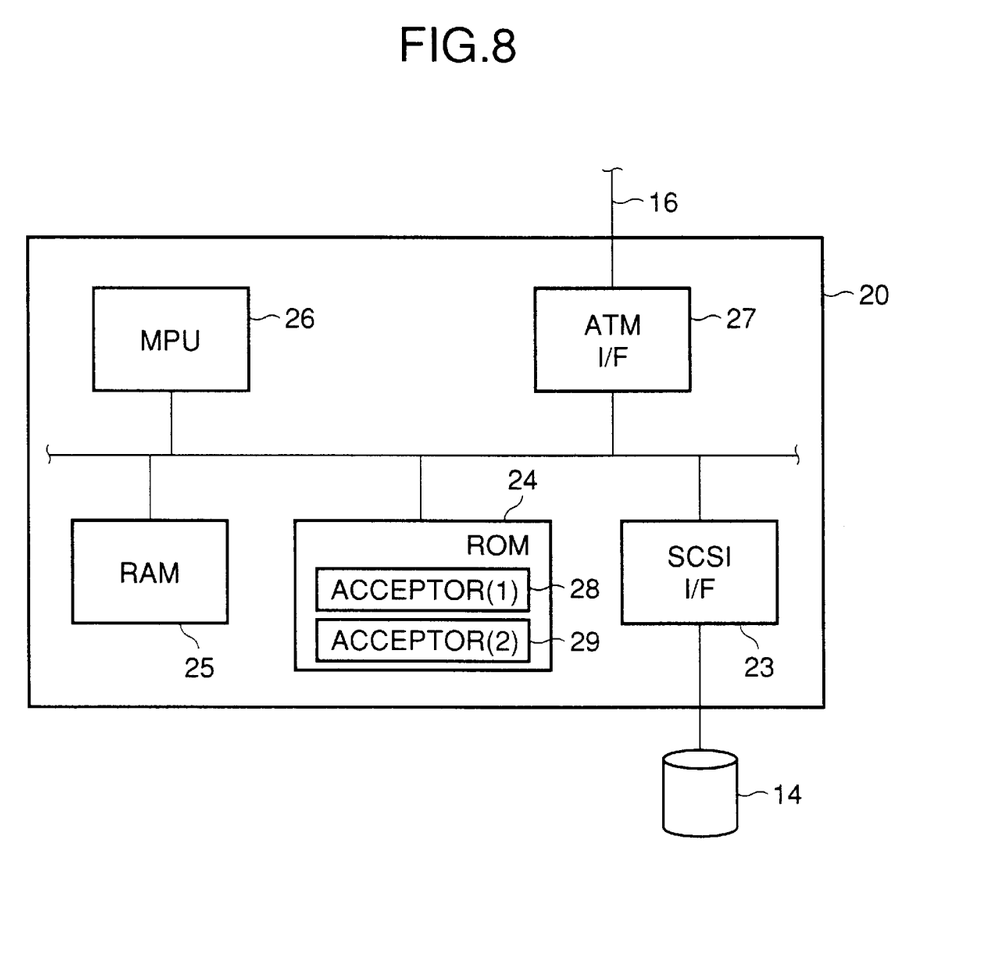
FIG. 8 is a view showing another example of a hardware configuration of the lock mechanism 20.

FIG. 8 is a view showing another example of a hardware configuration of the lock mechanism 20 (and lock mechanism 30). An ATM interface chip 27 is used in place of the fibre channel interface chip 21 of FIG. 6. The ATM interface has an IP address. For this reason, the ATM interface is shared by each ATM terminal, and makes it possible to access at high speed by transfer of ATM.

Namely, HDD is constructed such that the acceptor (1) 28 interprets AAL type 5 of ATM as a first protocol, and the acceptor (2) 29 interprets AAL type 1 protocol of ATM as a second protocol. At this time, since TCP/IP protocol passes through AAL type 5, file-level locking can be carried out using this protocol. Moreover, the protocol is changed and ALL type 1 is used. This makes it possible to perform very high-speed transfer of such as video data.

Thus, HDD, which is directly connected to ATM and which has a lock mechanism that is not conventionally in existence, can be constructed. Since ATM protocol corresponds to a wide area network (network connected in the world), a shared disk can be accessed via Internet anywhere in the world.

[Third Embodiment]

The following will explain a case in which IP over 1394 protocol of P1394 is used as a first protocol and SBP-2 (Serial Bus protocol 2) of P1394 or AV/C (Audio Video protocol) is used as a second protocol.

HDD, which is directly connected to P1394 and which has an IP address and which is shared by the respective P1394 processing units, can be constructed as follows.

Namely, HDD is constructed such that the acceptor (1) 28 interprets IP over 1394 of P1394 as a first protocol, and the acceptor (2) 29 interprets SBP-2 of P1394 or AV/C protocol as a second protocol. At this time, since TCP/IP protocol passes through IP over 1394, file-level locking can be carried out using this protocol. Moreover, the protocol is changed and AV/C is used. This makes it possible to perform very high-speed transfer of such as video data.

Thus, HDD, which is directly connected to P1394 and which has a lock mechanism that is not conventionally in existence, can be constructed. A digital video camera and a hard disk can be directly connected to each other not through a personal computer, and the range of uses for hard disk can be wide.

The invention may be also a recording medium in which the file shared program on the side of the storage units or the file processing program on the side of the processing units is recorded.

As a recording medium in which the file shared program or the file processing program is recorded, an optical disk such as CD-ROM, an optical magnetic disk such as MO, a magnetic disk such as a flexible disk, a magnetic tape, an IC card, etc., may be used in addition to ROM 24, RAM 25, HDD 14.

What is claimed is:

1. A shared file system, comprising:
   a network in which a plurality of protocols are usable;
   a plurality of file processing apparatuses interconnected by said network; and
   a plurality of storage units which are connected to said file processing apparatuses via said network, wherein each storage unit comprises a lock mechanism which comprises:
   a first acceptor for receiving a file lock request from said file processing apparatuses by use of a first protocol;
   a sender for sending a file access approval to said file processing apparatuses which requests a file lock upon receipt of said file lock request; and
   a second acceptor for receiving, by use of a second protocol, a file access instruction from the file processing apparatus to which said file access approval was sent.

2. The shared file system according to claim 1, wherein said file lock mechanism switches the operation of said first and said second acceptor according to the protocol from said network.

3. The shared file system according to claim 1, wherein said first protocol is a network protocol, and said second protocol is a storage protocol.

4. The shared file system according to claim 1, wherein said file lock mechanism comprises, in an integrated manner and built inside thereof:
- a network interface for connection with said network;
- a storage interface for connection with the body of said storage unit;
- a control unit provided between said network interface and said storage interface, for controlling the entire lock mechanism;
- a first storage unit for storing a program for operating said first acceptor and said second acceptor; and
- a second storage until for operating said first and second acceptor using the program read from said first storage unit under the control of said control unit.

5. A shared file device accessed via a network by a plurality of file processing apparatuses interconnected by said network in which a plurality of protocols are usable, said shared file device comprising a plurality of storage units each comprising a lock mechanism, said lock mechanism, comprising:
- a first acceptor for receiving a file lock request from said file processing apparatuses by use of a first protocol;
- a sender for sending a file access approval to said file processing apparatus which requests a file lock upon receipt of said file lock request; and
- a second acceptor for receiving, by use of a second protocol, a file access instruction from the file processing apparatus to which said file access approval is sent.

6. The shared file device according to claim 5, wherein said file lock mechanism switches the operation of said first and said second acceptor according to the protocol from said network.

7. A computer-readable storage medium having a program recorded thereon; where said program is to make the computer execute a file processing method for accessing a shared file device in which a plurality of storage units each comprise a lock mechanism, in which the shared file device connected to a network, in which a plurality of protocols are usable, via said network, said method comprising:
- sending a file lock request to said shared file device by use of a first protocol;
- accepting a file access approval from said shared file apparatus to which said file lock request is sent; and
- sending a file access instruction to said shared file device by use of a second protocol upon receipt of said file access approval.

* * * * *